United States Patent [19]

Laing et al.

[11] Patent Number: 4,818,193
[45] Date of Patent: Apr. 4, 1989

[54] CENTRIFUGAL PUMP SELECTIVELY MOUNTABLE IN CENTERLINE OR INLINE POSITION

[75] Inventors: Karsten A. Laing; Birger J. Laing, both of Remseck-2, Fed. Rep. of Germany

[73] Assignee: Laing Holding and Associates, San Diego, Calif.

[21] Appl. No.: 98,363

[22] Filed: Sep. 17, 1987

[30] Foreign Application Priority Data

Sep. 18, 1986 [DE] Fed. Rep. of Germany ....... 3631710

[51] Int. Cl.$^4$ ............................................. F04B 39/12
[52] U.S. Cl. ............................ 417/423.15; 417/423.14
[58] Field of Search .............. 417/360, 423 L, 423 G, 417/423 P, 423 T; 415/126, 127, 201, DIG. 3

[56] References Cited

U.S. PATENT DOCUMENTS

| | | | |
|---|---|---|---|
| 1,118,739 | 11/1914 | Carter | 415/126 X |
| 2,747,513 | 5/1956 | Atkinson | 415/201 |
| 3,187,675 | 6/1965 | Vejde | 417/423 T |
| 3,398,695 | 8/1968 | Pritz | 415/127 |
| 3,946,648 | 3/1976 | Schneider | 415/DIG. 3 X |
| 4,661,044 | 4/1987 | Freeland | 415/201 |

Primary Examiner—Carlton R. Croyle
Assistant Examiner—Eugene L. Szczecina, Jr.

[57] ABSTRACT

The spiral housing of a centrifugal pump which forms a unit with an electric motor and consists of two parts flanged together by screws evenly distributed over its circumference. The axis of rotation on the impeller forms a 45 degree angle with the axis of the inlet port and the axis of the outlet port. The two ports of the spiral housing can be mounted in at least two positions. In the first position, the axis of the outlet port forms a 90 degree angle with the axis of the inlet port forming a centerline pump. In the second position, the axes of the ports form a 180 degree angle forming an inline pump.

5 Claims, 3 Drawing Sheets

CENTRIFUGAL PUMP SELECTIVELY MOUNTABLE IN CENTERLINE OR INLINE POSITION

BACKGROUND OF THE INVENTION

The majority of all centrifugal pumps have an inlet port in the center region of the spiral housing and an outlet port on its periphery so that the axes form a 90 degree angle. Pumps of this type are known as "centerline" pumps. It is desirable for many installations to have the inlet and outlet port on opposite sides. These types of pumps are known as "inline" pumps. If a centerline pump must be replaced, it can be done only with another centerline pump. On the other hand, more and more modern installations use inline pumps. Pump users which use both systems, such as most chemical plants, therefore must have replacement pumps of both types in stock. It is desirable to have one pump which can serve both purposes.

SUMMARY OF THE INVENTION

The invention relates to a motor-pump unit which can be mounted alternatively as a centerline or an inline pump. The invention is based on an impeller, the axis of which forms an 45 degree angle with both the axis of the inlet port and the axis of the outlet port. The spiral housing consists of two portions flanged together in a plane of rotation perpendicular to the axis of rotation of the impeller and includes a gasket or sealing ring situated concentrically to said axis of rotation. The inlet port, normally comprising a flange, forms a unit with one portion, and the outlet port forms a unit with the other portion of the spiral housing. The two portions are screwed to each other with an even number of screws or similar fastening elements evenly distributed over the circumference of the spiral housing. In a first position, the axis of the outlet port forms a right angle with the axis of the inlet port, so that the pump-motor unit forms a centerline pump. When the two ports of the spiral housing are manually screwed relative to each other with a 180 degree angle between the axis of the inlet port and the outlet port, the pump becomes an inline pump.

A preferred embodiment of the invention is a pump-motor unit in which the rotor forms a unit with the impeller and is separated from the stator by a spherical separation wall, which forms part of the wall of the wet region of the pump. The separation wall has an aperature which forms together with the inlet port and a hole through the armature a conduit for the suction side of the pump. The impeller consists of blades which define spiral channels. These channels produce streams of aerated liquid with radially extending vectors in a pre-determined direction. This direction is preferably chosen in such a way that inwardly directed extension of said vectors cross the center of a ball, which forms together with a concave bearing member, the only bearing of the pump.

An alternate version uses stationary blades forming a diffusor between the impeller outlet and the spiral channel. Instead of a multitude of evenly distributed diffusor blades, there is an alternative solution to prevent uneven radial forces acting on the impeller by means of only one blade separating the channel of the spiral housing into two channels, the entrances of which are 180 degrees apart, known as a dual volute pump.

DESCRIPTION OF THE PREFERRED EMBODIMENTS

Figure 1:
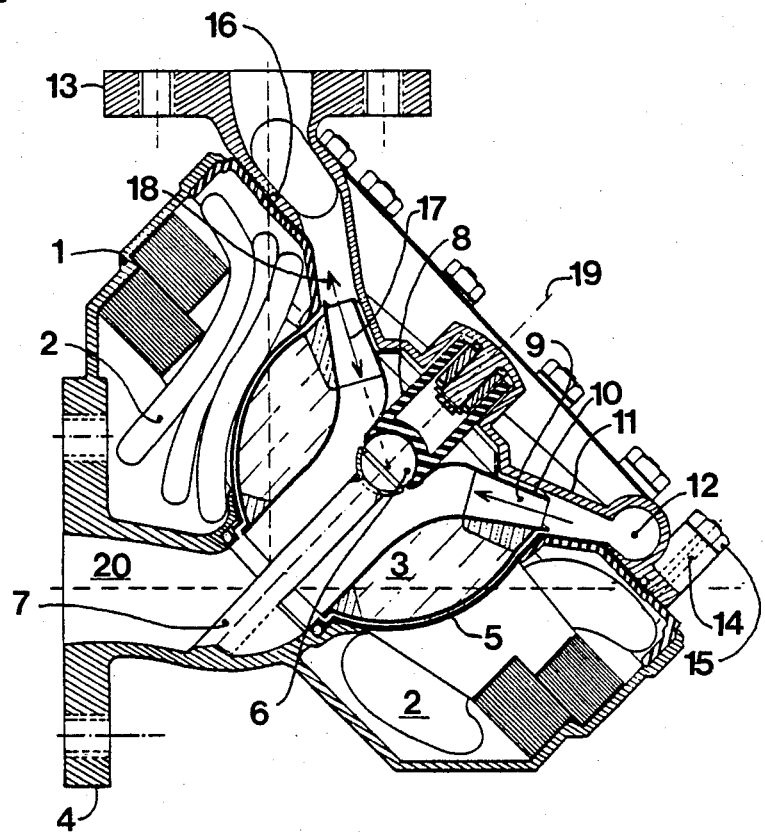
FIG. 1 shows the cross section of a pump according to the invention mounted in centerline position.

FIG. 1 shows a cross section through a pump-motor unit. The motor consisting of the stator 1 with coils 2 and an armature 3 forms a unit with the inlet flange 4. The separation wall 5 separates the stator 1,2 from the rotor 3 which rotates in the wet compartment of the pump. The bearing consists of the ball 6, mounted on the strut 7 which forms part of the stator housing and the rotating bearing cap 8 which forms part of the rotor 3 and the impeller portion consisting of the blades 9 and the wall 10. The second portion of the pump consists of the volute 11 with a spiral channel 12 and an outlet flange 13. This second portion is flanged to the motor part 1,2,5 by an even number of bolts 14 and nuts 15 and sealed by an O-ring 16. An elongation 17 in the direction towards the axis 19 of the radially aligned vector 18 of the center layer of the outlet stream leaving the impeller 3,9,10 crosses the axis of rotation 19 in the center of the ball 6 so that all vectors 18, including the elongations 17 more or less follow a geometrical cone, its center point lying within the ball 6. This prevents tilting of the rotor impeller unit 3,9,10 if reaction forces over the impeller are not evenly distributed over the circumference of the impeller. The bore through rotor 3 forms the inlet conduit for the impeller blades 9. The coils 2 are in thermal contact with the inlet duct 20.

Figure 2A:
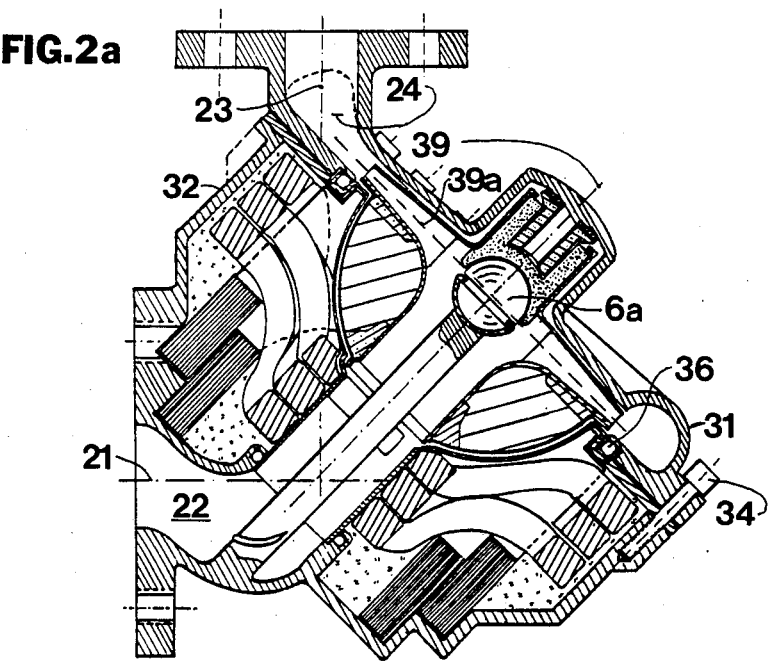
FIG. 2a shows a similar pump in centerline position.

FIG. 2 shows a similar design of pump. In FIG. 2a, the axis 21 of the inlet channel 22 forms a right angle with the axis 23 of the outlet channel 24, and in this arrangement forms a centerline pump. Both axes 21,23 form a 45 degree angle with the axis of rotation 39 of the impeller rotor unit 25,. The O-ring 36 forms the sealing between the motor part 32 and the volute 31. These two pump portions are screwed together by an even number of bolts 34. In contrast to the flow pattern in FIG. 1, the outlet stream of the impeller lies in a geometric circular disk 39a. Said disk crosses the axis of rotation 39 near the center of ball 6a.

Figure 2B:
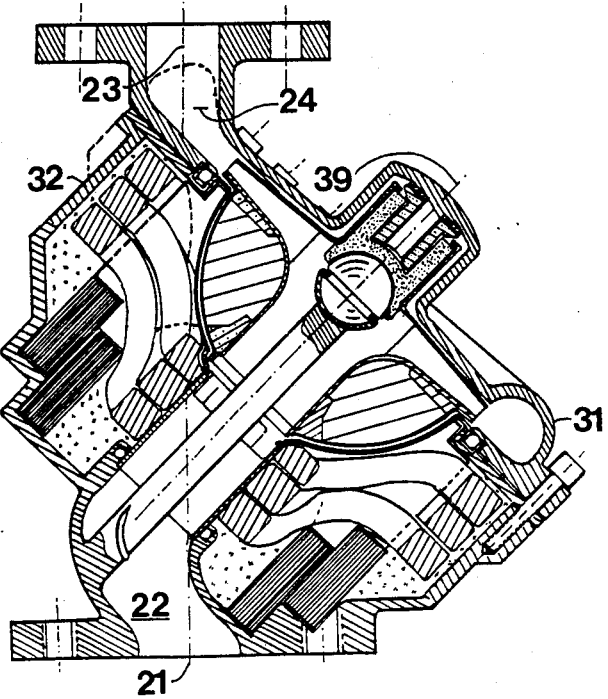
FIG. 2b shows the same pump as in 2a turned in inline position.

FIG. 2b shows the same pump, but the two portions are flanged together, whereby the motor part 32 is turned relative to the volute 31 by 180 degrees so that the angle between the axis 21 of the inlet 22 and the axis 23 of the outlet 24 forms a 180 degree angle, but, both axes 21 and 23 each still form 45 degree angles with the axis of rotation 39.

Figure 3:
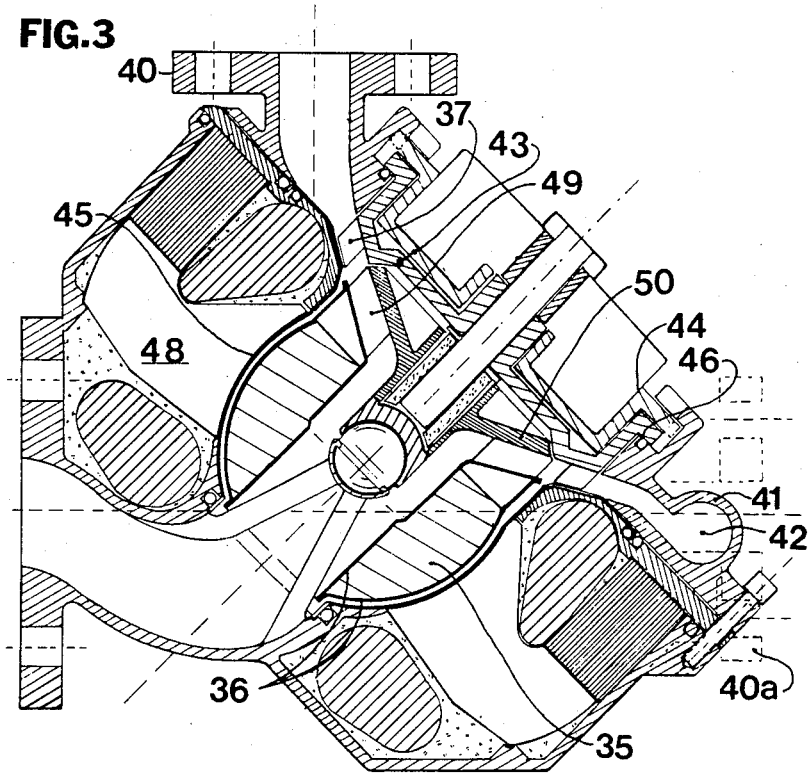
FIG. 3 shows a pump with a removable impeller rotor unit.

FIG. 3 shows a similar pump as shown in FIG. 1. The rotor 35 is enclosed in a stainless steel capsule 36 which fits in the separation wall 45 of the stator 48. Between the spiral channel 42 and the impeller portion 49,50 an annular blade cascade 37 is arranged which converts velocity of the liquid into pressure before the liquid reaches the spiral channel 42 and the outlet flange 40. The volute portion 41 has an opening covered with a cup shaped lid 43. Said lid is sealed with an O-ring 46 and held in postion by a bayonet type fitting 44 which can be opened manually. By this means, it is possible to have access to the inner part of the pump and to take the rotor impeller unit 35,49,50 out for pump cleaning purposes. The dotted configuration 40a shows the inline position achieved by mounting the volute 41 relative to the motor part 35,48, by 180 degrees.

Figure 4:
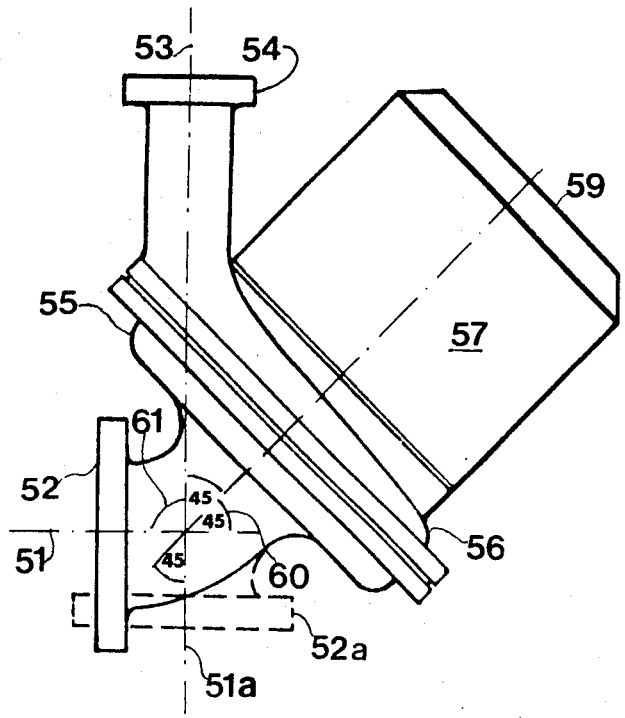
Fig. 4 shows a pump with a motor lying on that portion of the volute which forms a unit with the outlet port.

FIG. 4 shows a pump whereby the volute 56 with the outlet flange 54 forms part of the motor 57 and the inlet flange 52 forms a unit with the pump portion 55 flanged to the volute 56 with an even number of screws (not shown). The axis 51 of the inlet flange 52 forms a 45 degree angle 60 with the axis of rotation 59 and a 90 degree angle 61 with the axis 53 of the outlet flange 54. In this position, the pump is a centerline pump. The dotted configuration shows an axis 51a of the inlet flange 52a forming a 180 degree angle with the axis 53 of the outlet flange 54. This is achieved by loosening the screws and turning the pump portion 55 relative to the volute 56 by 180 degrees. In this position, the pump is an inline pump.

I claim:

1. A centrifugal pump with a first port and perpendicular to this port a first axis which appertains to the first port and a second port and a second axis appertaining in the same way to said second port, the pump forming a unit with an electric motor driving an impeller with an appertaining axis of rotation, all three axes lying in the same geometrical plane, the first axis and the second axis forming an angle of 45 degrees with the axis of rotation, the pump exhibiting a housing consisting of two portions connected to each other along a periphery lying in a plane of rotation appertaining to the axis of rotation, one of said ports forming a unit with the remaining portion of the pump housing, said two portions being selectively mountable in a first position in which the first and the second axis form an angle of 90 degrees and in a second position in which the first and the second axis form a single line.

2. A centrifugal pump as per claim 1 characterized in that the electric motor consists of a stator (1,2,32) and a rotor (3,25,35), the stator being separated from the rotor (3,25,35) by a magnetically permeable separation wall (5,45) in the shape of a sphere by a gap between the stator and the rotor and that the rotor (3,25,35) is pivotably mounted on a bearing which consists of a ball (6) and a bearing cap (8), arranged in the center of said sphere.

3. A centrifugal pump as per claim 1, characterized in that the stator 1,2,32 forms a unit with the inlet port 22.

4. A centrifugal pump as per claim 1, characterized in that the stator of the electric motor (57) forms a unit with the outlet port (54).

5. A centrifugal pump as per claim 2, characterized in that the center layer of the outlet stream leaves the impeller (3,9,10) on the surface of a circular disk or cone whereby the center of said disk or cone lies within the ball (6).

* * * * *